United States Patent [19]

DeSantis et al.

[11] Patent Number: 5,628,052
[45] Date of Patent: May 6, 1997

[54] WIRELESS COMMUNICATION SYSTEM USING DISTRIBUTED SWITCHED ANTENNAS

[75] Inventors: Charles M. DeSantis, Neptune; David J. Helmkamp, Jersey City; Raymond A. Sackett, Rumson, all of N.J.

[73] Assignee: Lucent Technologies Inc., Murray Hill, N.J.

[21] Appl. No.: 304,319

[22] Filed: Sep. 12, 1994

[51] Int. Cl.$^6$ ...................................................... H04Q 7/38
[52] U.S. Cl. ...................... 455/33.3; 455/33.1; 455/54.1; 370/334
[58] Field of Search ................................ 455/33.3, 33.2, 455/33.1, 54.1, 56.1, 101, 277.1, 277.2, 278.1, 134, 135; 370/95.1, 95.3, 29; 379/59

[56] References Cited

U.S. PATENT DOCUMENTS

| | | | |
|---|---|---|---|
| 4,513,412 | 4/1985 | Cox | 370/29 |
| 4,797,947 | 1/1989 | Labedz | 455/33.3 |
| 5,164,942 | 11/1992 | Kamerman et al. | 370/94.1 |
| 5,241,701 | 8/1993 | Andoh | 455/272 |
| 5,260,944 | 11/1993 | Tomabechi | 370/95.1 |
| 5,276,920 | 1/1994 | Kuisma | 455/101 |

FOREIGN PATENT DOCUMENTS

| | | |
|---|---|---|
| 0271347A2 | 6/1988 | European Pat. Off. |
| 0477158A2 | 3/1992 | European Pat. Off. |

Primary Examiner—Reinhard J. Eisenzopf
Assistant Examiner—Lee Nguyen

[57] ABSTRACT

Increased coverage and macro diversity from a single base station in a wireless communication system by having a base station coupled to N antennas is described. Increased coverage and macro diversity are achieved by transmitting from the base station N control messages each via one of the antennas, and transmitting a data message addressed to a mobile unit via a particular one of the antennas previously assigned to the mobile unit for an active call. The mobile unit receives the control messages and the data message and analyzes the control messages to identify from the antennas a best antenna. The mobile unit then transmits to the base station a new antenna request identifying the best antenna in an uplink control slot of a frame. The uplink control field is associated with the particular one of the antennas. The base station uses the best antenna to transmit subsequent data messages addressed to the mobile unit. A random access technique, to allow mobile units that are going from an inactive status to an active status, is provided by connecting all base station antennas together during non-call-affiliated slots in the uplink portion of the frame.

15 Claims, 9 Drawing Sheets

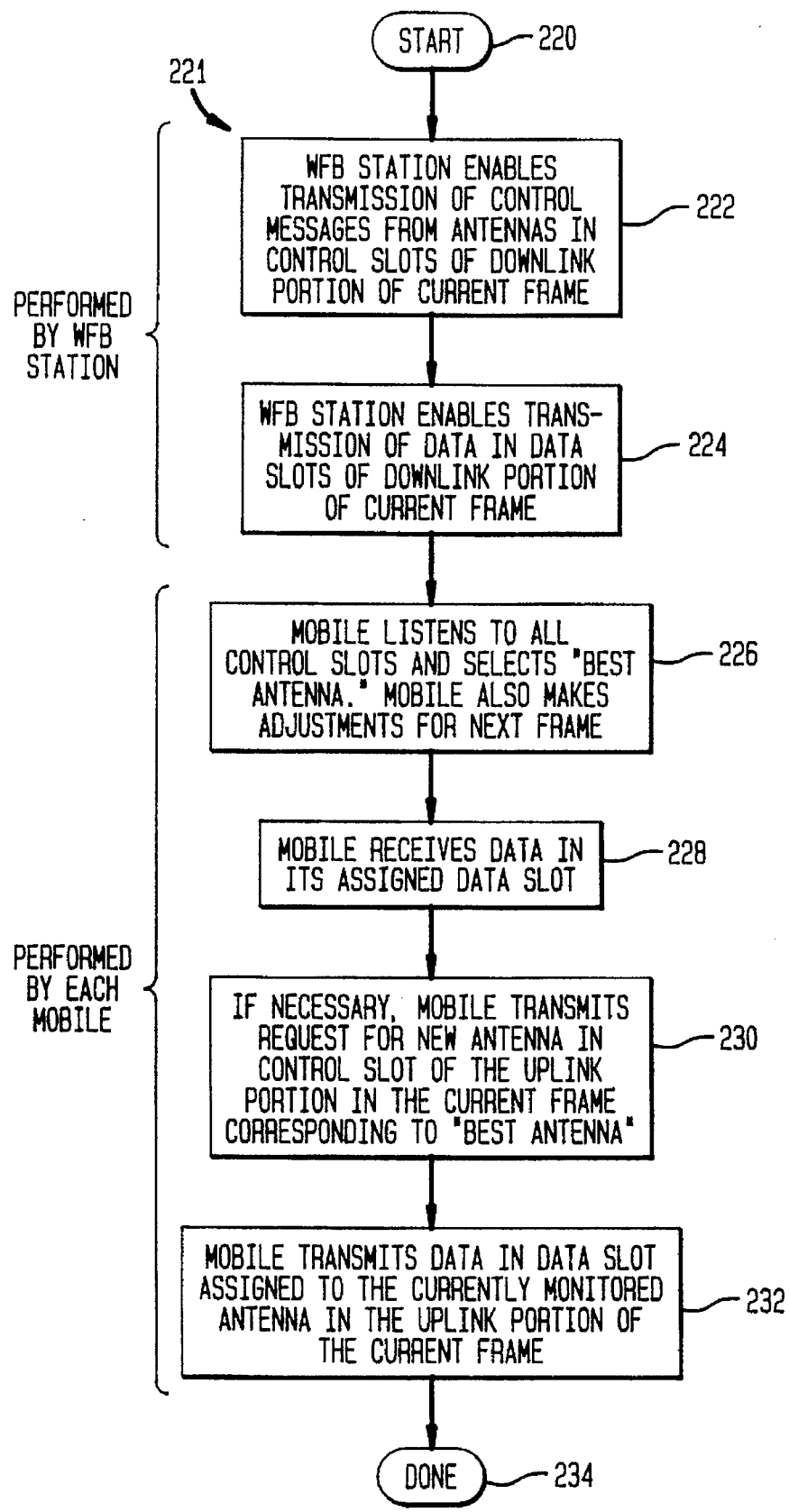

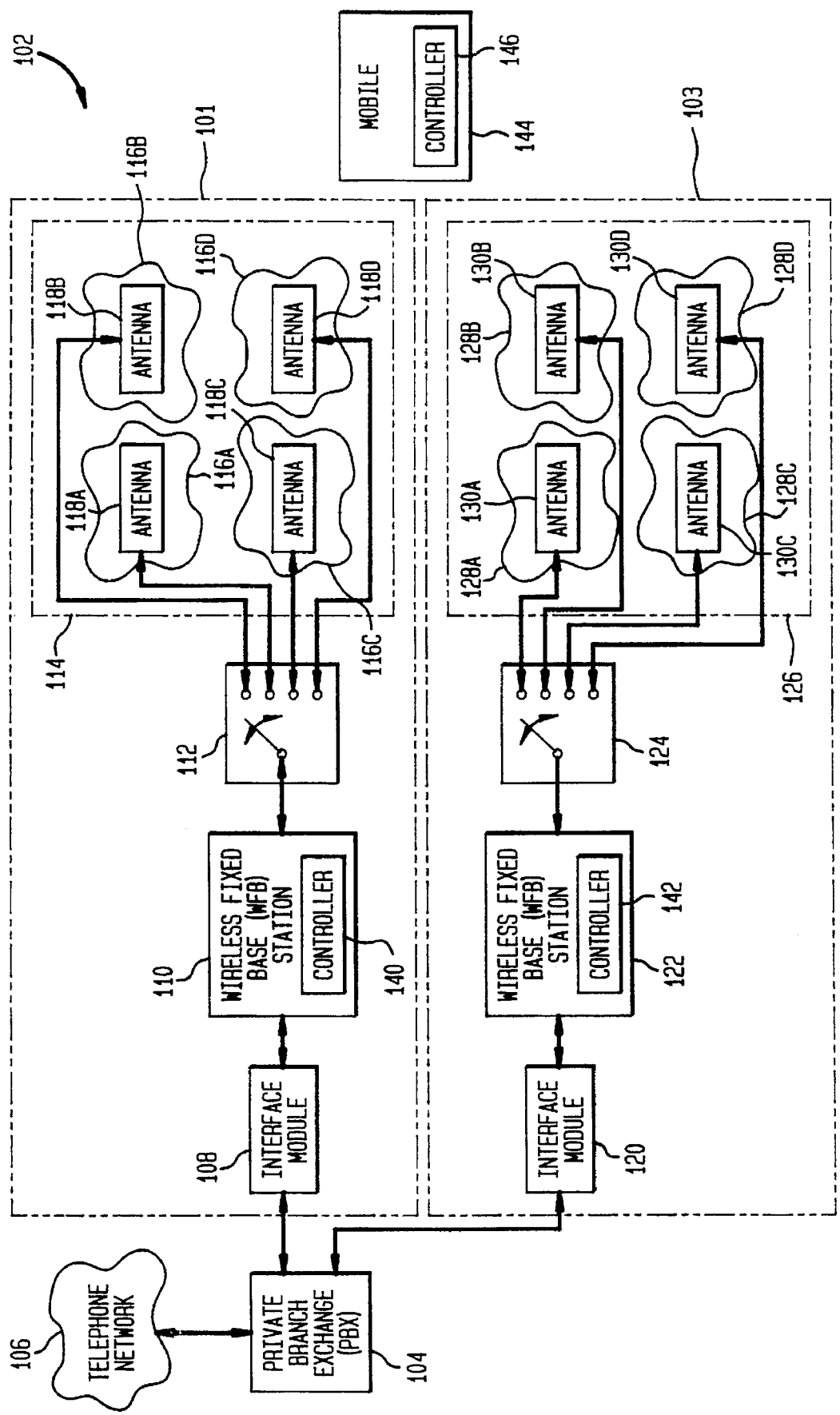

WIRELESS COMMUNICATION SYSTEM USING DISTRIBUTED SWITCHED ANTENNAS

BACKGROUND OF THE INVENTION

1. Field of the Invention

The present invention relates generally to wireless communication systems, and more particularly to using switched, distributed antennas in a wireless communication system.

2. Related Art

Typically, a wireless communication system (such as a cellular telephone system) covers a relatively large geographical area. The mobile units (also called, simply, mobiles) in this typical wireless communication system are usually positioned outside of buildings and communicate with base stations located on towers that are distributed throughout the coverage region. Accordingly, this typical system is called herein an "outdoor" wireless communication system.

It is desirable to establish a wireless communication system within a building (i.e., an "indoor" wireless communication system). This indoor wireless system would preferably support mobiles located throughout the interior of the building that communicate with base stations located within the building.

Indoor wireless systems, however, face many technical challenges. For example, mobiles can be distributed throughout an area that is much larger than the coverage achievable with a base station having a single antenna that is radiating an officially sanctioned, transmitted power level. The use of multiple, complex base stations to improve coverage is expensive.

In addition, an indoor RF (radio frequency) propagation path is characterized by multipath fading effects that result in the production of multiple copies of the desired signal being created by reflections and scattering off of objects located in the propagation path. These multipath signals vary in amplitude and phase with respect to each other, such that at the receiver, the vector sum of all of these signals cause the envelope of the resultant RF carrier to undergo rapid fluctuations in amplitude and phase as a function of position, time and frequency.

Also, pulsed or digital signals (which are typically used in wireless communication systems), which are composed of many frequency components having precise phase and amplitude relationships to one another, are very prone to distortion due to time and frequency dispersion (i.e., the propagation time and path attenuation vary with frequency). In addition, path attenuation varies over a wide range of power laws in both distance and direction because of the complex nature of such scattering and absorption. The arrival of a pulse of energy will be spread in time due to the reception of multiple "copies" of the pulse that have been reflected off both stationary and mobile scatterers. The individual replicas of the pulse arrive at the receiver at different times because of the different path lengths. This time delay spread of digital signals causes intersymbol interference (ISI), limiting the signaling rate for a desired level of error rate performance.

Thus, what is required is an indoor wireless communication system which efficiently and effectively addresses the above technical challenges.

SUMMARY OF THE INVENTION

The present invention is directed to a system and method of achieving extended coverage in a wireless communication system by having a base station coupled to N antennas rather than by having multiple, expensive base stations. As a result, macro diversity can be implemented in a straight-forward manner, i.e., signal blocking can be minimized during communications by selecting an antenna that has better propagation characteristics to the mobile than the one in current use.

A mobile is typically assigned a frequency channel and a slot within a frame for the duration of an active call. When the call is finished, the channel and slot assignments are removed from that mobile and returned to the system for use in other active calls or system functions.

The mobile may be anywhere within the desired coverage area of the System, but outside the area of coverage achievable by a single base station/antenna. Instead of adding additional base station/antenna nodes, as is done in typical systems, the present invention adds additional antennas to a single base station such that for any active, communication channel/slot, the mobile involved in the active call is reachable via the most optimally placed antenna. As the mobile moves through the system area, it listens to the transmissions of all available antennas (radiators) and continuously informs the base station of its "best" choice of available radiators. The base station will then follow the mobile by communicating over the "best" (by the mobiles reckoning) possible link. Thus, increased coverage over a single base station/antenna combination is achieved while also achieving effective macro diversity, i.e., always choosing and using the best link for communication by selecting the best antenna given the mobile's current position.

According to a first embodiment, the present invention operates by transmitting from the base station, n control messages via each of the antennas, and transmitting a data message addressed to a mobile unit via a particular one of the antennas previously assigned to the mobile unit for that particular call. The mobile unit receives the control messages and the data message and analyzes the control messages to identify a best antenna. The mobile unit then transmits to the base station a new antenna request identifying the best antenna in an uplink control slot of a frame. The uplink control slot is associated with the particular one of the antennas. The base station changes to that antenna and continues to use it as the current "best" antenna, as determined from the mobile's point of view, to transmit subsequent data messages addressed to the mobile unit.

According to a second embodiment of the present invention, the base station transmits n antenna control messages in n antenna control message bit fields of a downlink control/data slot of a frame. The downlink control/data slot is associated with a mobile unit during an active call. Each of the antenna control messages is transmitted via one of the antennas. The base station also transmits other system control information and a data message addressed to the mobile unit in other bit fields of the downlink control/data slot, wherein the system control/data message is transmitted via a particular one of the antennas previously assigned to the mobile unit for that particular call. The mobile unit receives the antenna control messages, system control messages and the data message, and analyzes the antenna control portions of the control message to identify from the antennas a "best" antenna. The mobile unit transmits to the base station a new antenna request identifying the best antenna in a control bit field of an uplink control/data slot of the frame. The uplink control/data slot is associated with the mobile unit during an active call. Each of the n antenna control bit fields of the uplink control/data slot are always associated with a particular one of the n antennas. The base station, in response to the new antenna request, uses the "best" antenna to transmit one or more subsequent control/data messages addressed to the mobile unit.

The present invention achieves superior voice quality by providing sufficient processing alternatives (e.g., using both micro and macro diversity) to overcome multipath distortion. The present invention is cost effective (that is, it may be implemented for a reasonable cost), since its costliest components and circuits are associated with the radio portion of the system, e.g., synthesizers, filters, and modular-demodulators, and these are minimized while achieving extended coverage.

The present invention minimizes bandwidth per channel to ensure efficient spectrum utilization and to minimize overall frequency spectrum occupancy. The number of channels are estimated based upon the density of individual systems anticipated in a given area.

In the present invention, the RF power level is adjustable so as to insure good performance and to minimize co-channel and adjacent channel interference. The present invention facilitates the solution of coverage issues by the addition of multiple antennas per base station (rather than by increasing power). Multiple antennas are also used to overcome fading problems. In the present invention, channel/frequency selection is achieved by examining the available spectrum and identifying the next available suitable channel.

In one embodiment of the present invention, at most one active mobile unit is assigned to each downlink slot and to each uplink slot. In an alternative embodiment, a plurality of active mobile units may be assigned to each downlink slot and to each uplink slot on multiple frequencies. In this alternate embodiment, a unique frequency is assigned to each active mobile unit assigned to the same downlink slot and to the same uplink slot.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein:

FIGS. 2B and 2C are flowcharts depicting the operation of the present invention according to the first embodiment of the present invention;

FIG. 5 is a third embodiment of the present invention showing an extension of the principles disclosed in the first two embodiments to a multi cell wireless communication system.

DETAILED DESCRIPTION OF THE PREFERRED EMBODIMENTS

1. Overview of the Present Invention

Figure 1:
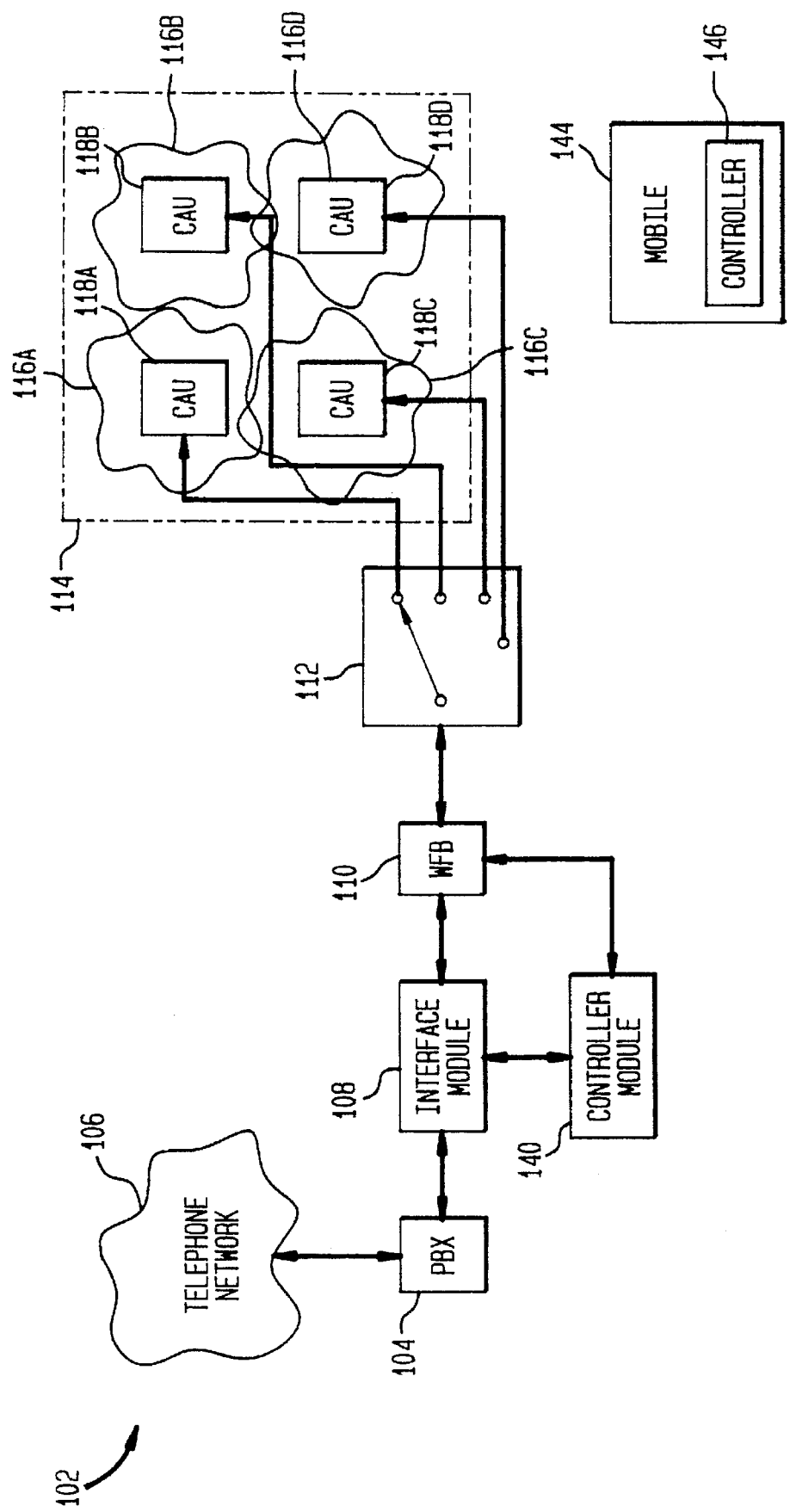
FIG. 1 is a block diagram of a wireless communication system according to a preferred embodiment of the present invention.

The present invention is directed to a system and method for achieving increased coverage by using switched antennas, while minimizing the use of complex, expensive base stations, in a wireless communication system. As a result, macro diversity can also be implemented in a straightforward manner. The present invention is also directed to wireless communication systems which employ this RF distribution system and method.

The wireless communication system of the present invention is well adapted for use as an "indoor" wireless system wherein its coverage is generally limited to the building(s) and/or other structure(s) in which it is installed. However, the wireless communication system of the present invention can work equally well as an "outdoor" or any other type of wireless system.

The present invention supports mobile terminals (such as mobile telephones; the terms "mobile terminals", "mobile units", and "mobiles" are used interchangeably herein) which communicate with one or more base stations using radio signals. These base stations are each preferably connected to a plurality of antennas, since a single antenna connected to each base station may be insufficient to provide coverage to all locations within a building, particularly a multi-story building. The base stations are preferably hard wired, via twisted pair cable, back to a private branch exchange (PBX) or key system, which provides connectivity to the telephone network.

The present invention is described herein with reference to a TDMA/TDD (time division multiple access/time division duplexing) access technique. However, as will be apparent to persons skilled in the relevant art, the present invention is adaptable for use with other types of access techniques, such as frequency division multiple access (FDMA), code division multiple access (CDMA), and frequency division duplexing (FDD).

The present invention includes a number of features for overcoming the propagation effects discussed above. Such features enable the present invention to solve these propagation problems while meeting desired voice quality and traffic requirements.

In particular, the present invention employs antenna diversity to overcome many of the propagation effects discussed above. According to the present invention, a plurality of antennas (connected to the base stations) are dispersed throughout the building to achieve area coverage. This dispersal of antennas also overcomes at least one multipath environmental effect: blocking (also called shadowing), through the use of a technique called macro diversity.

The present invention also includes other features for overcoming the propagation effects discussed above. Specifically, in the present invention, the antennas connected to the base stations have directional properties to aid in the reduction of multipath distortion. Also, each mobile unit includes dual antennas (or an antenna with dual, selectable or combinable polarizations) to protect against fading effects that occur over fractions of a wavelength (this is called "micro diversity").

Micro-diversity selection in TDD systems can be as fast as a decision within a given frame, while macro-diversity selection may require at least a one frame delay. Fortunately, in indoor systems, the frequency-selective, multipath fading on the channel is relatively slow, relative to most nominal frame lengths.

2. Structure of the Present Invention

FIG. 1 is a block diagram of a wireless communication system 102 according to a preferred embodiment of the present invention. The wireless communication system 102 covers a geographical area that includes one or more cells 114, each containing one or more sub-cells 116, respectively (the sizes and shapes of the cell 114 and sub-cells 116 are exaggerated in FIG. 1 for readability purposes; in practice, each cell 114 generally conforms to the sizes and shapes of the sub-cells 116, respectively, contained therein). A cell is an area of radio coverage for a base station over which a predefined system performance level has been established. A sub-cell is an area of coverage for a single antenna radiator over which predefined system performance is achieved. The wireless communication system 102 provides wireless communication services to mobile units, such as mobile unit 144, which may be located in, or proximate to, one or more of the cells 114.

Preferably, each mobile unit 144 represents a receiver/transmitter unit having two antennas (not shown). Dual antennas in each mobile unit 144 provides protection against fading effects that occur over fractions of a wavelength. This is called micro diversity. Each mobile unit 144 determines when to switch among its local antennas based upon previous, short term information about the channel quality. This receiver/transmitter unit may also contain adaptive equalization circuitry in order to further help overcome multipath distortion. For example, a weighted sum of the dual antenna outputs can be formed, periodically and made available to the receiver/transmitter. Additional features of the mobile units 144 are discussed below.

The wireless communication system 102 may be established within a structure, such as a building, or may be established in a combination of structures. For example, each cell 114 may correspond to a floor of a building. Alternatively, multiple cells, such as cells 114, 126 of FIG. 5 may correspond to different areas of the same floor. It should be understood, however, that the wireless communication system 102 of the present invention is equally adapted for use outside of any structure, or for use both inside and outside of one or more structures.

The wireless communication system 102 includes one or more wireless fixed base (WFB) stations 110 which are also simply called "base stations" herein. Each base station 110 is connected to an RF switch 112, respectively. Each switch 112 represents any well known RF (radio frequency) multi-position switch, having RF isolation among its positions of 20 dB or better. Additionally, the switch 112 should have a switching speed commensurate with the intra-slot or intra-frame rates in a TDMA/TDD system.

Each switch 112 is connected to one or more cell antenna units (CAU) 118, respectively. The number of cell antenna units 118, respectively connected to each switch 112, may vary from switch to switch, or may be the same for all switches 112, 124, as in FIG. 5. In the embodiment shown in FIG. 1, the switch 112 is connected to four cell antenna units 118. Four CAUs per base station are considered to be optimum from system performance and cost considerations.

The cell antenna units 118 serve the dual purpose of extended site coverage from a single base and spatial diversity for avoiding and/or overcoming multipath fading. This type of diversity is called macro diversity, to reflect the large relative spacing (compared to a wavelength) between or among the antenna units 118.

With regard to site coverage, the cell antenna units 118 are placed throughout the region of interest in order to insure complete radio coverage and to overcome multipath fading at certain remote terminal locations. Specifically, one antenna unit 118 is placed in each sub-cell 116 of the cell 114. By having a plurality of cell antenna units 118, it is possible to have less base stations 110 (otherwise, one base station and its associated interface and controller (e.g. 108 and 140) would be required for each sub-cell 116), thereby greatly simplifying system installation and use and minimizing system cost.

The cell antenna units 118 are connected to their respective base station 110 via the switch 112 using preferably coaxial cables that are each less than or equal to approximately 200 feet in length. Each antenna unit 118 preferably includes an antenna and a duplexer. The duplexer, for TDD operation, used to overcome cable losses, preferably includes a pair of RF (radio frequency) switches, a power amplifier for transmission to the various mobiles 144 and a low noise amplifier for reception from the various mobiles 144. DC power for the amplifiers and the control signals for selecting transmit or receive are provided over the coaxial cable.

Maximum transmitter power from the antennas 118 is preferably limited to 100 mW, peak power. Transmitter power is controlled to minimize adjacent channel interference and to adapt to system coverage needs.

The switch 112 selectively connects its respective base station 110 to its respective antenna units 118. At any moment of time, each base station 110 is connected to one antenna unit 118 via the switch 112. For example, at any moment of time, base station 110 is connected to one antenna unit 118A–118D via switch 112.

Each base station 110 is a time division multiple access (TDMA) and/or time division duplex (TDD) radio system. A TDMA/TDD system makes use of successive time slots to alternately transmit or receive information. Generally, these transmit and receive time slots are grouped together to define a frame. Each base station 110 includes a transceiver (transmitter/receiver combination) that is connected to its respective switch 112. Each base station 110 employs well known wireless communication techniques to exchange information with mobile units 144 via the antenna units 118. The transmitter and receiver of the base station are alternately connected to the switch and the selected cell antennas synchronously with the downlink and uplink portions of the frame. Downlink is a transmission from the base to a mobile. Uplink is a transmission from the mobile to the base. Digital modulation techniques such as M-ary FSK or M-ary PSK are preferred. All deployed base stations are synchronized with respect to their transmit and receive cycles for lowest intra-system interference.

3. General Operation of the Present Invention

According to the present invention, a mobile unit 144 communicates with a base station (such as base station 110, for example) via one of the antennas (such as antenna 118A, for example) connected to the base station 110. Prior to communicating with the mobile unit 144 using this antenna 118A, the base station 110 sends an appropriate command to its switch 112 to command the switch 112 to connect it (i.e., the base station 110) to the antenna 118A. The mobile unit 144 listens to transmissions from all of the antennas 118A–118D. If the mobile unit 144 determines that one of the antennas 118B–118D (that it is not currently using) is "better" than the antenna 118A that it is currently using (for illustrative purposes, assume that antenna 118C is the "better" antenna), then the mobile unit 144 sends a message identifying this "better" antenna 118C to the base station 110. The base station 110 then communicates with the mobile unit 144 using this "better" antenna 118C.

This operation of the present invention is preferably implemented by a base station controller 140 that is preferably contained in each of the base station 110, in combination with a mobile unit controller 146 that is contained in each mobile unit 144. These controllers 140, 146 as well as the operation of the present invention pertaining to macro diversity, is described in greater detail below.

As discussed above, each mobile unit 144 listens to transmissions from the antennas 118 and determines which is "best". The manner in which this determination is made shall now be discussed.

The determination of "best" antenna is based on a number of factors which are implementation dependent. For example, the "best" antenna determination can be based on a received signal strength indication(RSSI). Alternatively, the "best" antenna determination can be based on bit error rate (BER) (e.g., by determining the instantaneous error rate from the eye pattern fill-in, referred to as a pseudo-error count.) Or, the "best" antenna determination can be based on any combination of the above. A decision based upon a combination of factors (such as those discussed above) reduces the chances for making a bad antenna selection. Techniques for determining RSSI and BER are well known to persons skilled in the relevant art.

The determination of "best" antenna may be performed entirely at the mobile units 144, or alternatively performed by both the base station 110, and the mobile units 144. As discussed above, the mobile units 144 communicate their respective selections of "best" antenna to the base station 110.

The base station 110 is connected to a private branch exchange (PBX) 104 via interface module 108. The interface module 108 converts the radio signals from the base station 110 into a standard telecommunication interface, such as tip-ring, or any proprietary interface as warranted. The structure and operation of the interface module 108 will be apparent to persons skilled in the relevant art. The interface module 108 may be integrated with the PBXs or the base station 110, or may be distinct from both.

The interface module 108, base station 110, switch 112, and antennas 118 represent a radio sub-system 101 (FIG. 5). Similarly, in FIG. 5, the interface module 120, base station 122, switch 124, and antennas 130 represent another radio sub-system 103.

The operation of the base station 110 and the mobile units 144 as discussed herein is preferably implemented using a base station controller 140 contained in each base station 110, and a mobile unit controller 146 contained in each mobile unit 144. These controllers 140, 144 may represent hardware implemented state machines, or may alternatively represent processors operating in accordance with software, or may represent any combination of the above.

The PBX 104 connects the radio sub-system 101 to a telephone network 106 (which may include local and/or long distance networks). In this manner, mobile units 144 can communicate with fixed and/or mobile units located outside of the cells 114 via the telephone network 106. The structure and operation of the PBX 104 and the telephone network 106 will be apparent to persons skilled in the relevant art.

4. The First Embodiment of the Present Invention

The first embodiment of the present invention is described in the following sections.

4.1. Description of the First Embodiment

The first embodiment of the present invention employs the configuration shown in FIG. 1 and described above. It also implements both micro and macro diversity to overcome multipath fading effects. In the first embodiment of the present invention, separate slots in the frame are provided for control and data information. Each control slot is dedicated to a specific antenna. The first embodiment of the present invention is best applied to single base station applications.

4.2. Structure of the Frame (FIG. 2A)

Figure 2A:
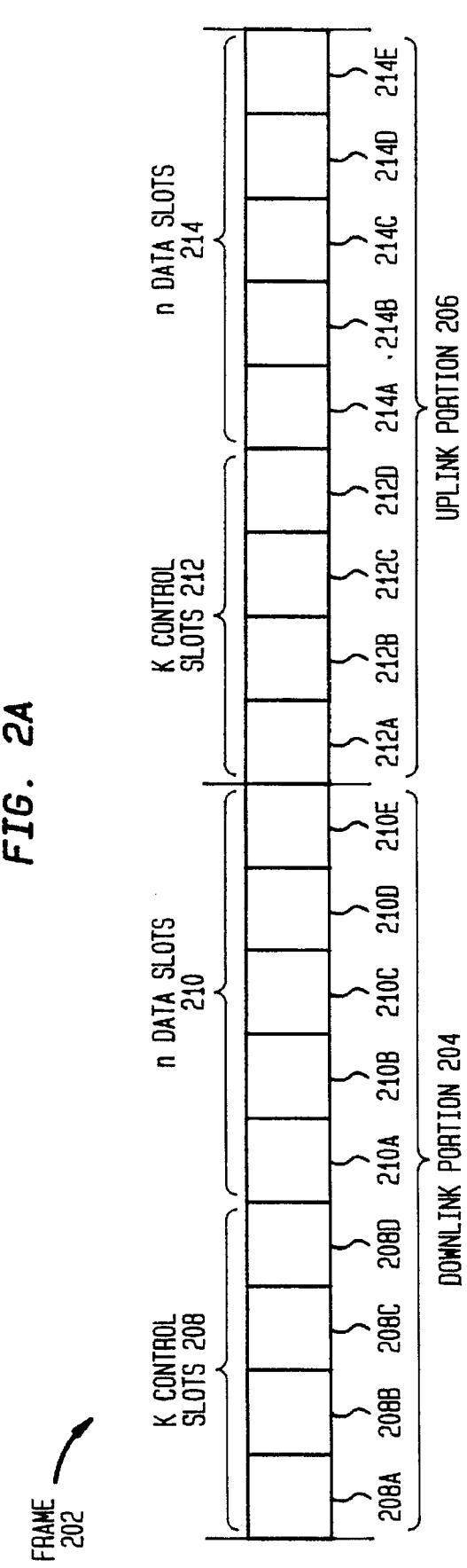
FIG. 2A is a frame format according to a first embodiment of the present invention.

According to a first embodiment of the present invention, data and control signals are transferred between the base station 110 and the mobile units 144 using TDMA (time division multiple access) frames such as that shown in FIG. 2A. The first embodiment is adapted for use on a per cell basis.

For simplicity purposes, the operation of the present invention in accordance with this first embodiment of the present invention shall be described with reference to the radio sub-system 101. However, the procedures to be described are useful as a generalized description of how control and data information are conveyed between a base station and a mobile in any embodiment. The frame 202 has a downlink portion 204 and an uplink portion 206. The downlink portion 204 includes data and control signals which are transmitted from the base station 110 to the mobile units 144. The uplink portion 206 includes data and control signals which are transmitted from the mobile units 144 to the base station 110.

The downlink portion 204 includes k downlink control slots 208 and n downlink data slots 210. The uplink portion 206 includes k uplink control slots 212 and n uplink data slots 214. k is equal to the number of antennas 118 connected to the switch 112. Thus, in the example embodiment of FIG. 1, k is equal to four. n is equal to five in the example frame 202 shown in FIG. 2A, although the value of n is implementation dependent.

Note that a control signal refers to a signal that affects system control, while a data signal refers to a signal containing user data. It should be understood that the data slots 210, 214 can carry any type of information, such as voice information, video information, facsimile information, etc. The phrases "data message" and "data" and similar phrases are intended herein to refer to all types of user information, such as those just listed.

Each downlink control slot 208 is associated with one of the antennas 118 connected to the switch 112. Similarly, each uplink control slot 212 is associated with one of the antennas 118 connected to the switch 112. The downlink control slot 208 and the uplink control slot 212 associated with a particular antenna occupy the same relative position in the frame 202. For example, if downlink control slot 208C is associated with antenna 118B, the n uplink control slot 212C is also associated with antenna 118B.

In general, no data slots are associated with or preassigned to mobiles. These slots are assigned only when calls are set up, and then de-assigned when calls are torn down.

4.3. Operation of Antenna Selection Control of the First Embodiment

An active mobile unit is defined herein as being a mobile unit 144 that is currently participating in an established telephone call with the base station 110. Consider any downlink data slot 210 that can be associated with an active mobile unit. Any uplink data slot 214 can also be associated with any active mobile unit. The downlink data slot 210 and the uplink data slot 214 associated with a particular active mobile unit occupy the same relative position in their respective half frame 204, 206. For example, if downlink data slot 210B is associated with an active mobile unit, then uplink data slot 214B is also associated with the active mobile unit.

The maximum number of simultaneous telephone calls is a function of the number of downlink data slots 210 (or, equivalently, is a function of the number of uplink data slots 214). In other words, the maximum number of simultaneous telephone calls is equal to n.

As just discussed, a downlink data slot 210 and an uplink data slot 214 are associated with each active mobile unit.

Also, any antenna 118A–118D can be associated with (or assigned to) any active mobile unit. These associations may change from one frame to the next frame. However, during any particular frame, an active mobile unit exchanges data with the base station 110 via its assigned antenna and in its assigned downlink and uplink data slots (and, also, at an assigned frequency).

The operation of the wireless communication system 102 according to the first embodiment of the present invention shall now be described with reference to a flowchart 221 in FIG. 2B. Flowchart 221 depicts he operational steps that are performed to exchange data and control signals between the base station 110 and an active mobile unit, such as mobile unit 144, during a telephone call that has been previously established (the procedure for establishing telephone calls is discussed below with reference to FIG. 2C). The operational steps depicted in Flowchart 221 represent the operation of the base station 110 and the active mobile unit 144 during the exchange of a single frame 202, called the "current" frame 202. The steps of Flowchart 221 are performed for each frame. Flowchart 221 begins with step 220, where control immediately passes to step 222.

In step 222, the base station 110 enables the transmission of control messages via the antennas 118A–118D in the downlink control slots 208 of the current frame 202. Specifically, the base station 110 commands the switch 112 to connect the base station 110 to the antenna 118A. Then, the base station 110 transmits a control message via antenna 118A in downlink control slot 208A (it is assumed that downlink control slot 208A is always associated with antenna 118A for illustrative purposes). Then, the base station 110 commands the switch 112 to connect the base station 110 to the antenna 118B.

Then, the base station 110 transmits a control message via antenna 118B in downlink control slot 208B (it is assumed that downlink control slot 208B is always associated with antenna 118B for illustrative purposes). Similarly, the base station 110 transmits the same control messages via antennas 118C and 118D in downlink control slots 208C and 208D, respectively (it is assumed that downlink control slots 208C and 208D are respectively, always associated with antennas 118C and 118D for illustrative purposes). In this way, the base station 110 broadcasts the same message through each of its associated antennas 118. In addition, the base station 110 is required to perform broadcasting on every frame to insure the ability of mobiles to sync to the system and allow for system access.

Generally, a control message is broadcasted in the downlink control slots which contain coded data that identifies the respective antennas. For example, the control message transmitted in downlink control slot 208D contains coded data that identifies antenna 118D. The control messages may also be longer messages containing, in addition, coded data pertaining to frequency and slot selection, and telephonic terminal state control information, for example. As described below, mobile units 144 use this information as a handshaking mechanism to establish calls and to adjust to changing communication conditions during the life of previously established active calls. For example, slot selection information may be transmitted in response to a new antenna request from an active mobile unit (see step 230, described below).

In step 224, the base station 110 enables the transmission of data messages via the appropriate antennas 118A–118D in the appropriate downlink data slots 210 of the current frame 202 (such data messages are received from the telephone network 106 via the PBX 104 and the interface module 108). For example, assume that the base station 110 has a data message that is addressed to the mobile unit 144. Also assume that, for the current frame 202, this mobile unit 144 is assigned to antenna 118C and downlink data slot 210A. Thus, in step 224, the base station 110 commands the switch 112 to connect the base station 110 to antenna 118C. Then, the base station 110 transmits the data message via antenna 118C in downlink data slot 210A. The base station 110 operates in a similar manner to transmit other appropriate data messages in the appropriate downlink data slots 210 via the appropriate antennas 118A–118D for other active mobiles.

Note that steps 222 and 224 (just described) were performed by the base station 110. Steps 226, 228,230, and 232 are performed by each active mobile unit. For illustrative purposes, these steps are described with respect to mobile unit 144.

In step 226, the mobile unit 144 listens to all of the downlink control slots 208 in the current frame 202 (that is, the mobile unit 144 attempts to receive the control messages contained in all of the control slots 208). The mobile unit 144 determines from these control slots which of the antennas 118A–118D is the "best" antenna. Generally, the "best" antenna represents the antenna 118A–118D with which the mobile unit 144 can communicate with the base station 110 with the highest possible transmission quality. Procedures for determining the "best" antenna are discussed above.

Also during step 226, the mobile unit 114 extracts frequency and/or slot selection information, if any, from the downlink control slot 208 associated with its currently assigned antenna 118. For example, if the mobile unit 114 is assigned to antenna 118A during this portion of the call, then the mobile unit 114 extracts frequency and/or slot selection information, if any, from the downlink control slot 208A. This frequency and/or slot selection information was inserted into the downlink control slot 208A by the base station 110 during step 222 (described above). This frequency and/or slot selection information must be acknowledged and agreed to by the mobile before any changes are made. The changes will take one (or more) frames to complete.

It is noted that the mobile unit 144 previously synchronized to, and maintains synchronization with, the timing of the frames transmitted from the base station 110 in any well known manner. In step 228, the mobile unit 144 receives data in the downlink data slot 210 assigned to it. As discussed above, for the current frame, each active mobile unit is associated with a downlink data slot 210. This association may change from frame to frame (see step 226, described above). During step 228, the mobile unit 144 receives data in the downlink data slot 210 previously assigned to it.

In step 230, the mobile unit 144 transmits, if necessary, a request for a new antenna to the base station 110 in the uplink control slot 212 associated with its "best" antenna selection. This is a random process based upon tile quality of the channel at any given time and location. The mobile decides when it needs improved performance as a function of time and its position at that time. For example, suppose that the mobile unit 144 is currently assigned to antenna 118A. Also suppose that in step 226 the mobile unit 144 determined that antenna 118C was the best antenna for its purposes. Accordingly, in step 230, the mobile unit 144 transmits a request for a new antenna (i.e., antenna 118C) to the base station 110 in the uplink control slot associated with the new best antenna 118C. Preferably, the mobile unit 144 only transmits such a request if the "best" antenna (determined in step 226) differs from its currently assigned antenna. Note that any request for a new antenna does not affect the operation of the mobile unit 144 during the current frame 202.

The request for a new antenna may not be clearly transmitted to the base station 110. This may be due to noise or other effects in the communication environment. The unsuccessful transmission of a new antenna request does not adversely affect the operation of the system, since the active mobile unit 144 will resend the request (if necessary) in the next frame (or in subsequent frames, until performance is improved.) In general, there is no negotiation when a mobile requires service from a different antenna. If it wants it, it gets it. On the other hand, frequency and time slot changes are always negotiated between base and mobile.

A polling procedure can also be used instead of the random access procedure just described. Each mobile is periodically queried to determine its state or need for service. For example, each mobile is asked to respond to the base via the best antenna at a particular time until all mobiles have been polled. During this response, requests for call establishment can be made. In a small system, e.g., less than 12 mobiles, the delay time for a response (with a 10 ms. frame duration) is less than or equal to 120 ms. Inactive mobiles do not have to be polled continuously, as long as the polling rate is short enough to provide acceptable dial tone delay. Polling insures that the "best" antenna for each mobile is always known by the base station.

In either the random or polled case, however, the need for a change request from the mobile is required before any change proceeds.

In step 232, the mobile unit 144 transmits data to the base station 110 in the uplink data slot 214 previously assigned to it. As discussed above, for the current frame, each active mobile unit is associated with an uplink data slot 214. This association may change from frame to frame and from call to call (reference is made to step 226, described above). During step 232, the base station 110 enables the RF switch 112 such that reception of uplink data slot 214 is by the antenna currently assigned to mobile 144. The base station 110 transfers this data to the telephone network 106 via the interface module 108 and the PBX in a well known manner. After performing step 232, performance of flowchart 221 is complete as indicated by step 234.

4.4. Call Setup in the First Embodiment

Figure 2C:
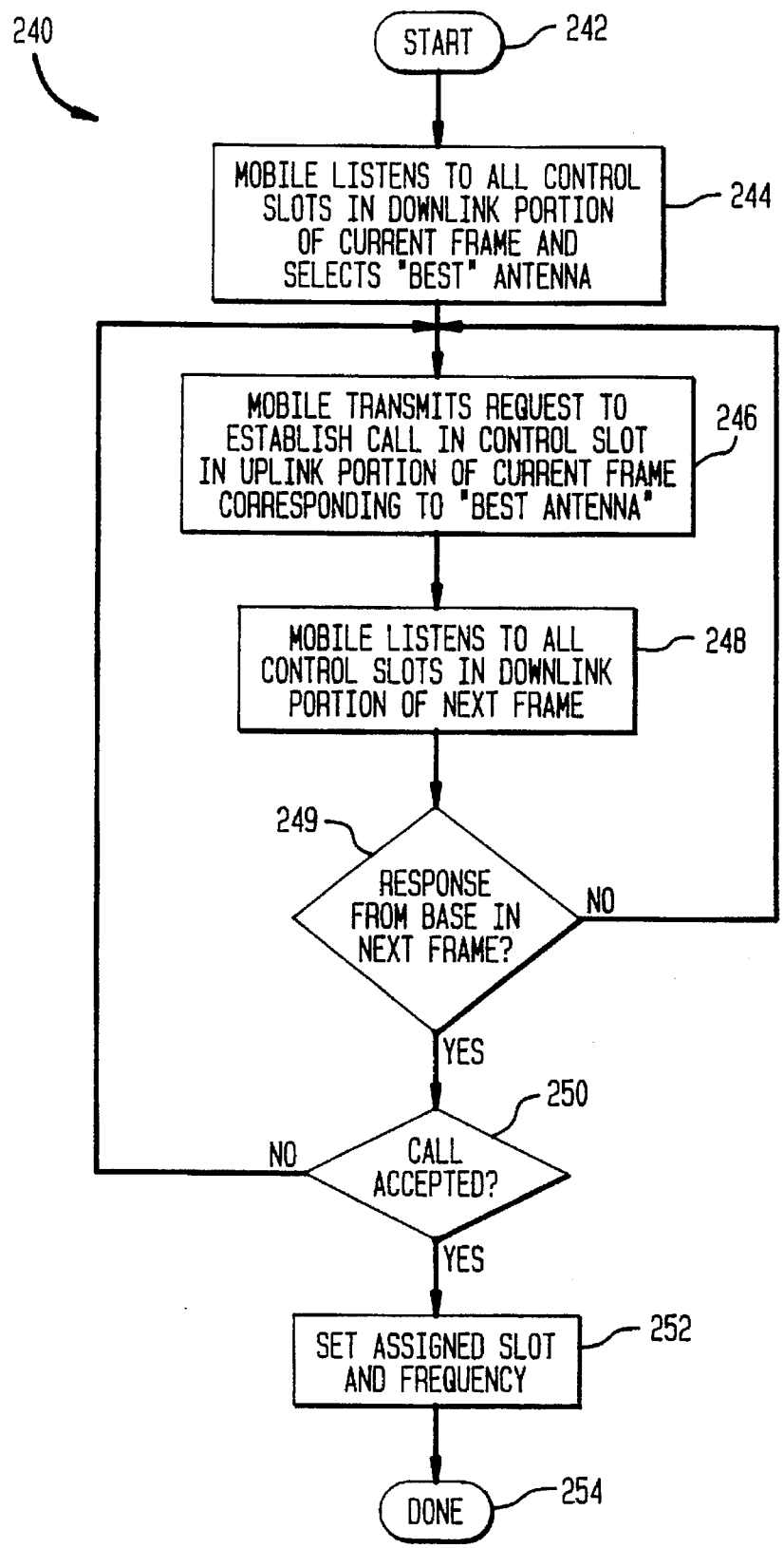

The operation of the wireless communication system 102 according to the first embodiment of the present invention shall now be further described with reference to a flowchart 240 in FIG. 2C. Flowchart 240 depicts the operational steps that are performed to establish a new telephone call between a mobile unit, such as mobile unit 144, and a base station, such as base station 110. The steps of Flowchart 240 are performed each time a mobile unit 144 attempts to establish a new telephone call. Flowchart 240 begins with step 242, where control immediately passes to step 244.

In step 244, a mobile unit, such as mobile unit 144, wishing to establish a new telephone call listens to all of the downlink control slots 208 in the current frame 202 (that is, the mobile unit 144 attempts to receive the control messages contained in all of the control slots 208). As stated above, the base station 110 is broadcasting control data on every frame by each antenna. The mobile unit 144 determines which of the antennas 118A–118D is the "best" antenna. Procedures for determining the "best" antenna are discussed above. It is noted that the mobile unit 144 previously synchronized to, and maintains synchronization with, the timing of the frames transmitted from the base station 110 in any well known manner.

In accordance with the random or polled access procedures, in step 246, the mobile unit 144 transmits a request to establish a new telephone call to the base station 110 in the uplink control slot 212A associated with the "best" antenna 118A.

The request to establish a new telephone call may not be clearly transmitted to the base station 110. This may be due to noise or other effects in the communication environment. This may also be due to conflict between multiple mobile units attempting to transmit during the same uplink control slot 212 (for example, it is possible that two or more mobile units may transmit during the same control slot, having made similar decisions about the best antenna). The unsuccessful transmission of a new telephone call request does not adversely affect the operation of the system, since the mobile unit 144 can resend the request (if necessary) in the next frame. In addition, there are well known "collision" algorithms that can be employed to mitigate these conflicts.

Upon receiving the request for a new telephone call from the mobile unit 144, the base station 110 determines whether to accept the request. The base station 110 makes this determination as follows: If the base station 110 has less than n (the number of downlink data slots) active mobiles to which it is transmitting data in active slots, then any one of the unused data slots is assigned to the mobile and the call is accepted.

In the case presented here, the mobile unit can choose an unused uplink control slot 212 to transmit on at a random time (as opposed to when requested to by the base.) Such transmissions are termed random access here. Random access transmissions would be used to initiate communication with the base for the purpose of setting up a voice call, for example.

If the base station 110 accepts the request for a new telephone call, then the base station 110 will communicate that acceptance in the downlink control slot 208 associated with the "best" antenna (determined by the mobile unit 144 in step 244) of the next frame. Such acceptance is preferably in the form of a control message containing information that identifies the mobile unit 144 that made the request, and that identifies the frequency, downlink data slot 210, uplink data slot 214, and antenna 118 assigned to the mobile unit 144.

In step 248, the mobile unit 144 reads control information contained in the downlink control slot 208 associated with the "best" antenna (determined in step 244) of the previous frame. As just discussed above, if the base station 110 accepted the request for a new telephone call, then the base station 110 would have communicated that acceptance in this downlink control slot 208. If this downlink control slot contains an acknowledgment of the mobiles request (step 249) from base station 110, but does not contain a call acceptance flag (step 250), then the mobile unit 144 determines that the call request was not accepted (step 250), and returns to step 246. (The search for a "best" antenna has already been done in step 248.) On the other hand, if the mobile does not receive an error free response from the base station, the mobile unit assumes the request was not received error-free and retransmits in accordance with step 246. To avoid an endless loop condition, the mobile unit can cease the request after m tries.

If the new call request was accepted (as determined in step 250), then the mobile unit 144 in step 252 makes any adjustments that are necessary to prepare for the immediately following frame (this "immediately following frame" is the frame which follows the "next frame"; recall that the "next frame" followed the "current frame "), such as adjusting for the frequency and the data slots assigned to the mobile unit 144 (see step 248). Operation of the flowchart 240 is complete after the completion of step 252, as indicated by step 254. Once the call is established, operation of the base station 110 and the mobile unit 144 is as shown in FIG. 2B, described above.

5. Second Embodiment

Figure 3A:
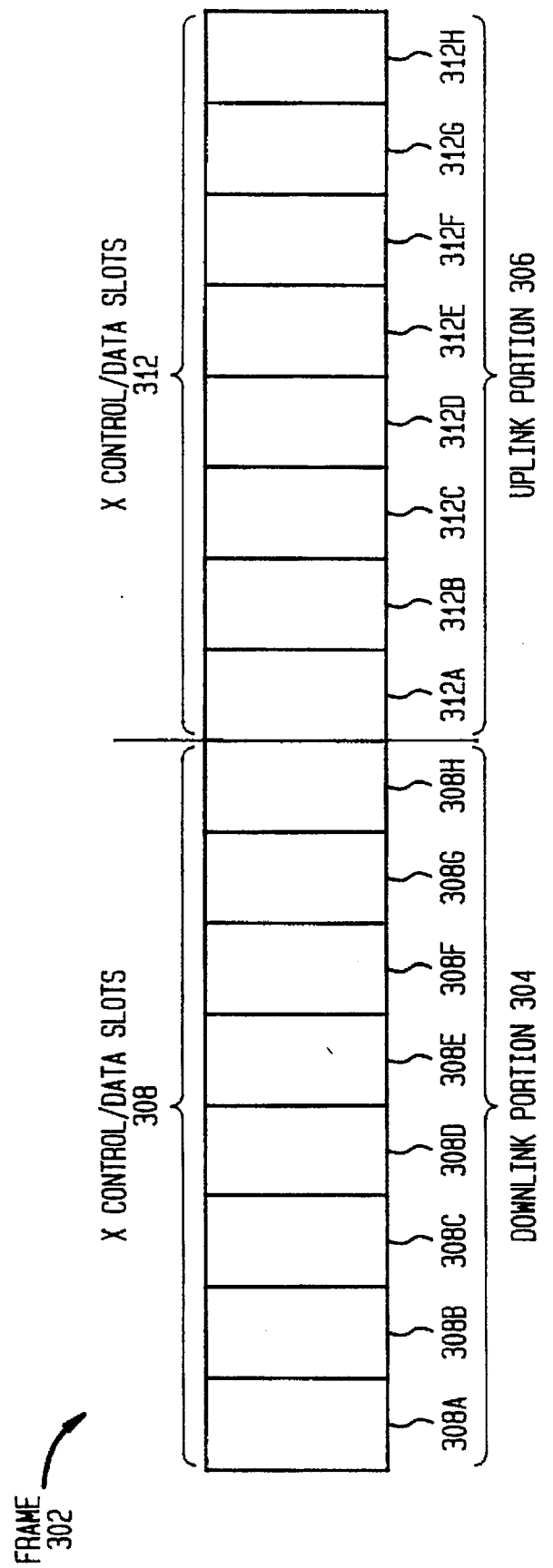
FIGS. 3A and 4 are frame formats according to a second embodiment of the present invention.

According to a second embodiment of the present invention, data and control signals are transferred between the base station 110, and the mobile units 144 using TDMA (time division multiple access) frames such as that shown in FIG. 3A. The physical structure of the second embodiment of the present invention is the same as that shown in FIG. 1 and described in Section 2, above. The frame of the second embodiment differs from the frame of the first embodiment in that the control and data information are now combined into specific fields of one slot. The number of these combined function slots in a frame is implementation dependent, but there is always one slot for each active call or other activity in the system. The second embodiment also employs both macro and micro diversity.

For simplicity purposes, the operation of the present invention in accordance with this second embodiment of the present invention shall be described with reference to the radio sub-system 101.

5.1 Structure of the Frame of the Second Embodiment

The frame 302 has a downlink portion 304 and an uplink portion 306. The downlink portion 304 includes data and control signals which are transmitted from the base station 110 to the mobile units 144. The uplink portion 306 includes data and control signals which are transmitted from the mobile units 144 to the base station 110.

The downlink portion 304 includes x downlink, combined control/data slots 308 and are herein after referred to simply as slots. The uplink portion 306 includes x uplink slots 3 12. The quantity x is equal to 8 in the example frame 302 shown in FIG. 3A, although the value of x is implementation dependent.

A downlink slot 308 is associated with each mobile unit that is on an active call. Each uplink slot 312 is also associated with an active mobile unit. The downlink slot 308 and the uplink slot 312 associated with a particular active mobile unit occupy the same relative position in the frame 302. For example, if downlink slot 308B is associated with an active mobile unit, then uplink slot 312B is also associated with the active mobile unit.

Figure 4:
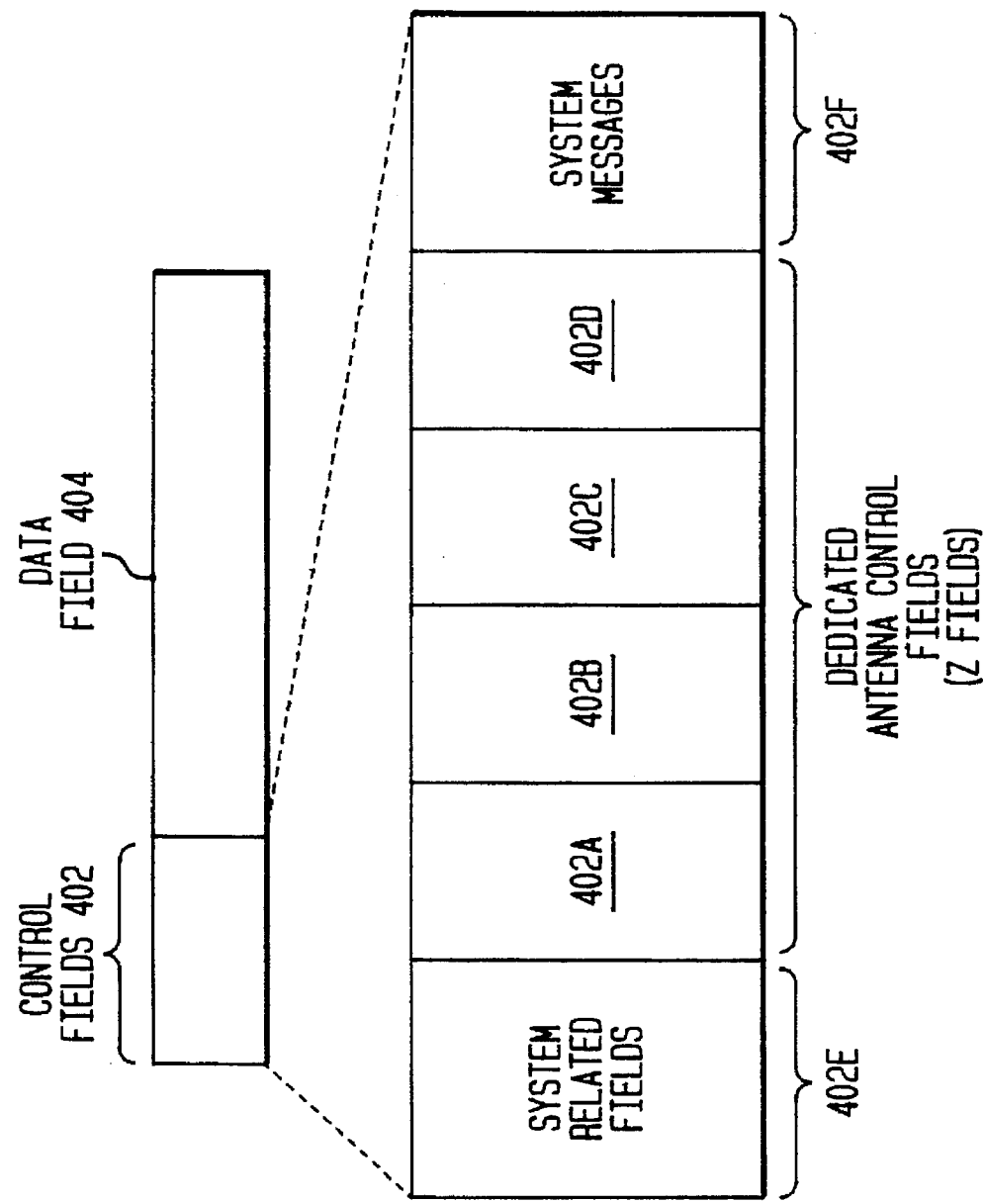

FIG. 4 illustrates the format of the downlink and uplink slots 308, 312. Each downlink and uplink slot 308, 312 includes a control field 402 and a single data field 404. The control field is broken down further into several sub-fields. For example, the field 402E preferably contains control information such as guard bits, preamble bits, synchronization bits and check bits. Sub-field 402F preferably contains system messages associated with usable frequencies, usable uplink slots, terminal status, update control messages and check bits. The fields 402A through D are referred to as z fields. Their number is equal to the number of antennas 118 connected to the switch 112 (thus, z is equal to 4 in this example). Each z field 402A–D is associated with one of the antennas 118 connected to the switch 112. The z fields are pertinent to the present invention. Their specific location is not important as long as they are present and their fixed position is known so that they can be monitored.

The size of each z field 402A–402D is at least two bits. Longer bit streams can be used and the patterns of the bits can be chosen to meet performance and cost goals of the system. The longer the pattern, in general, the more robust the detection of it, but the greater the cost for the circuitry/ algorithms involved. The mobile can make a decision of "best" antenna based upon the RSSI in each z field, or the number of errors in each z field, or both.

The foregoing description of the makeup of the control field 402 is meant to illustrate the kinds of information that a knowledgeable system designer might place in such fields. Other field layouts and field information will be apparent to persons skilled in the relevant art.

The maximum number of allowable telephone calls is a function of the number of downlink slots 308 (or, equivalently, is a function of the number of uplink slots 312). In other words, the maximum number of allowable telephone calls is a function of x. This represents one difference between the first and second embodiments of the present invention. The capacity for active telephone calls is greater in the second embodiment, since in the second embodiment, each slot contains both control and data information, while in the first embodiment, only some of the slots carry data information.

As just discussed, a downlink slot 308 and an uplink slot 312 are associated with each active mobile unit. Also, an antenna 118A–118D is associated with (or assigned to) each active mobile unit. These associations may change from one frame to the next frame. However, during any particular frame, an active mobile unit exchanges data with the base station 110 via its assigned antenna and in its assigned downlink and uplink slots 308, 312 (and, also, at an assigned frequency).

5.2. Description of Operation of the Second Embodiment

Figure 3B:
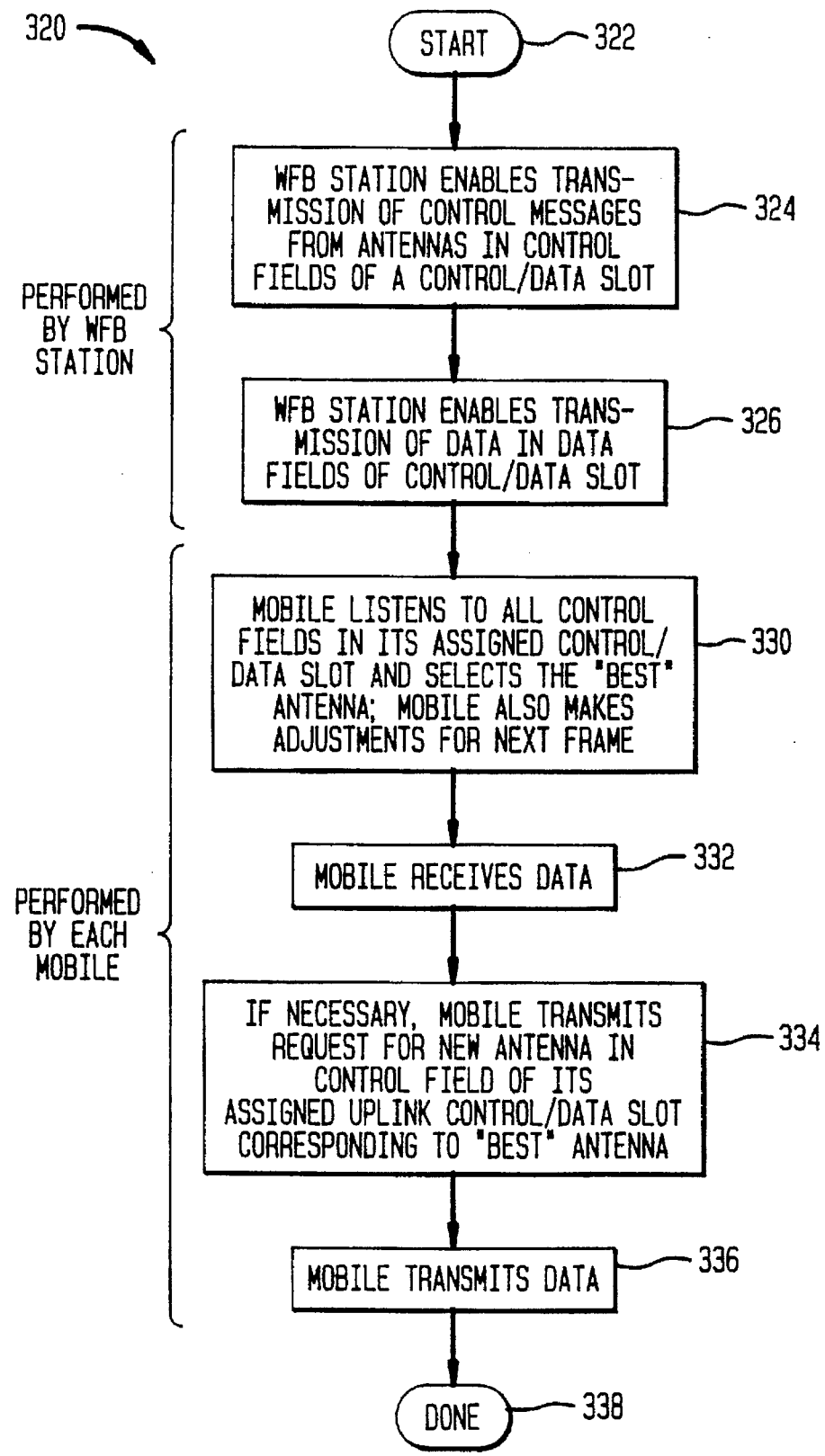
FIGS. 3B and 3C are flowcharts depicting the operation of the present invention according to the second embodiment of the present invention.

The operation of the wireless communication system 102 according to the second embodiment of the present invention shall now be described with reference to flowchart 320 in FIG. 3B. Flowchart 320 depicts the operational steps that are performed to exchange data and control signals between the base station 110 and an active mobile unit, such as mobile unit 144, during a telephone call that has been previously established (the procedure for establishing telephone calls according to the second embodiment is discussed below with reference to FIG. 3C). The operational steps depicted in Flowchart 320 represent the operation of the base station 110 and the active mobile unit 144 during the exchange of a single frame 302, called the "current" frame 302. The steps of Flowchart 320 are performed for each frame. Flowchart 320 begins with step 322, where control immediately passes to step 324.

Assume that the active call from Mobile unit 144 is associated with the downlink slot 308A and uplink slot 312A. In step 324, the base station 110 enables the transmission of control data in the control fields 402 of the downlink slot 308A of the current frame 302 via the antennas 118A–118D in the following manner. For illustrative purposes assume that the antenna 118A is assigned to the mobile unit 144 during the current frame 302. For the purposes of transmitting System Related Fields 402E and System Messages 402F, the base station 110 commands the switch 112 to connect the base station 110 to the antenna 118A. For the purposes of transmitting the z-fields 402A–402D associated with each antenna, the base station 110 commands the switch 112 to connect the base station 110 to the antenna assigned to a z-field during that z-field's portion of the slot. For example, if z-field 402B was assigned to antenna 118B then the base station 110 commands the switch 112 to connect the base station 110 to antenna 118B during z-field 402B.

In step 326, the base station 110 enables the transmission of a data message intended for mobile unit 144 via the antenna unit associated with the mobile unit (118A). This data message was received from the telephone network 106, for example, via the PBX 104 and the interface module 108. This data message is transmitted in data field 404 of downlink slot 308A of the current frame 302. In step 326, the base station 110 commands the switch 112 to connect base station 110 to antenna 118A during the transmission of data field 404 of downlink slot 302A of the current frame 302.

In step 330, the mobile unit 144 listens to its assigned downlink slot 308A including all contained control and data fields. From the reception of the z-fields 402A–402D, the mobile unit 144 determines which of the antennas 118A–118D is the "best" antenna. Procedures for determining the "best" antenna are discussed above. Also during step 330, the mobile unit extracts system information inserted into the system message field 402F of downlink slot 308A by the base station 110 during step 324 (described above). Such information may affect the operation of the base station and mobile unit 144 during the next frame (that is, the frame that immediately follows the current frame) as described above.

In step 332, the mobile unit 144 receives data from the data slot 404 in its downlink slot 308A of the current frame 302.

It is noted that steps 330 and 332 are performed by all of the active mobile units with regard to their respective downlink slots 308. After such performance of steps 330 and 332, step 334 is performed.

In step 334, the mobile unit 144 transmits, if necessary, a request for a new antenna to the base station 110. This new antenna request is transmitted in the uplink slot 312A associated with the mobile unit 144. More specifically, this new antenna request is transmitted in the z field 402A–D (in the uplink slot 312A) that is associated with the antenna 118 assigned to the mobile unit 144. For example, suppose that the mobile unit 144 is currently assigned to antenna 118B. Also suppose that in step 330 the mobile unit 144 determined that antenna 118C was the "best" antenna for its purposes. Accordingly, in step 334, the mobile unit 144 transmits a request for a new antenna (i.e., antenna 118C) to the base station 110 in the z field 402B (in the uplink slot 312A) that is associated with the antenna 118C. In fact, in this embodiment of the present invention, the mobile unit 144 is always transmitting its "best" antenna assessment in the appropriate z field (determined in step 330.) Note that any request for a new antenna does not affect the operation of the mobile unit 144 during the current frame 302.

The request for a new antenna may not be clearly transmitted to the base station 110. This may be due to noise or other effects in the communication environment. The unsuccessful transmission of a new antenna request does not adversely affect the operation of the system, since the active mobile unit 144 continuously sends its assessment of the best antenna in all succeeding frames.

Upon noting a change in the z fields 402A–402D from the mobile unit 144, the base station 110 determines which antenna to use for that mobile in the next downlink frame. The manner in which the base station 110 makes this determination is described above.

In step 336, the mobile unit 144 transmits data to the base station 110 in the data field 404 of its uplink slot 312A in the current frame. The base station 110 transfers this data to the telephone network 106, for example, via the interface module 108 and the PBX in a well known manner. After performing step 336, performance of flowchart 320 is complete as indicated by step 338.

5.3. Call Setup in the Second Embodiment

Figure 3C:
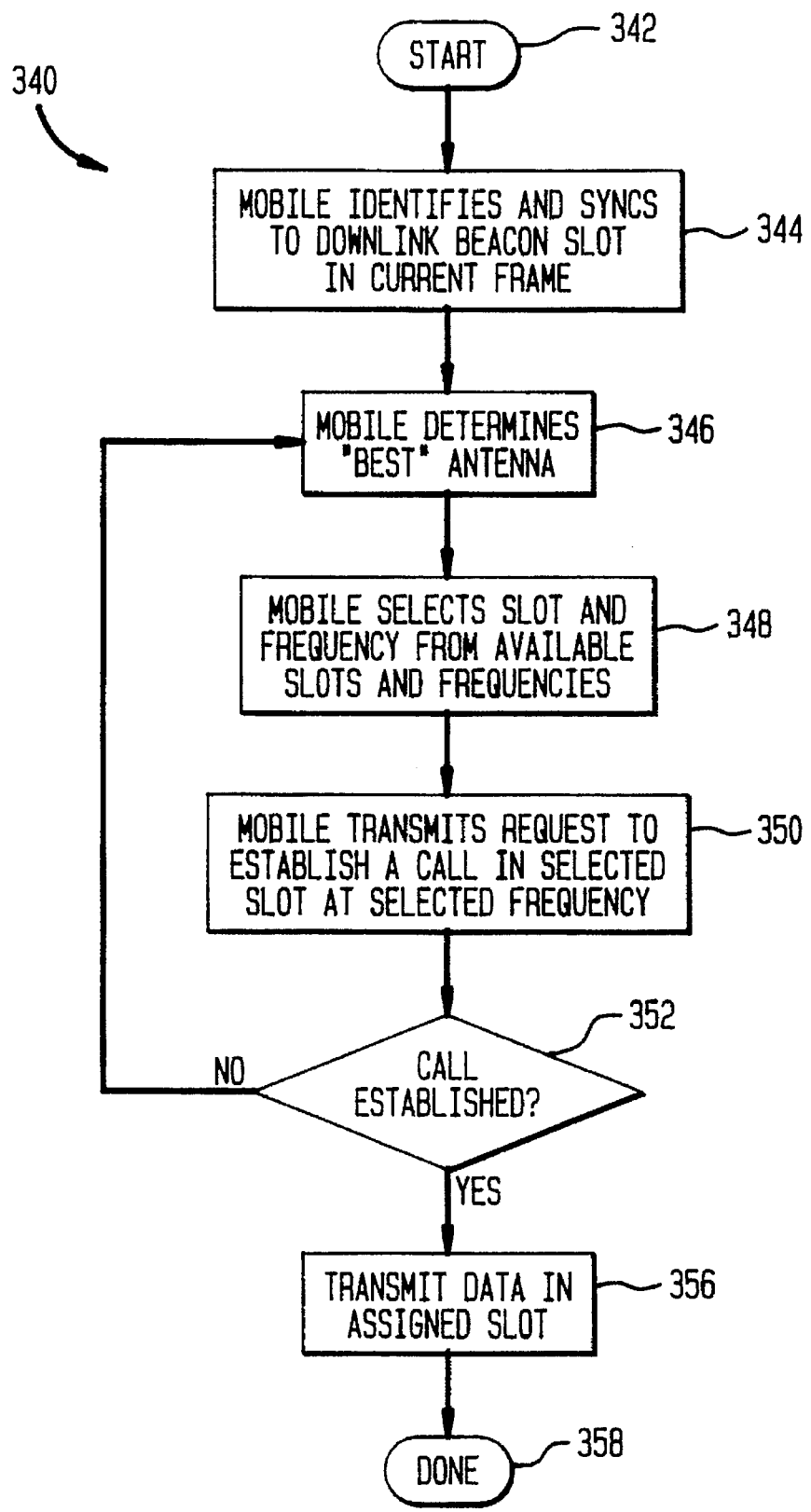

The operation of the wireless communication system 102 according to the second embodiment of the present invention shall now be further described with reference to a flowchart 340 in FIG. 3C. Flowchart 340 depicts the operational steps that are performed to establish a new telephone call between a mobile unit, such as mobile unit 144, and a base station, such as base station 110, according to the second embodiment. The steps of Flowchart 340 are performed each time a mobile unit 144 attempts to establish a new telephone call. Flowchart 340 begins with step 342, where control immediately passes to step 344.

The base station 110 is required to transmit system information in at least one downlink slot of every frame. To aid in clearly describing the process, assume that this required slot is slot 308E, for example. In step 344, a mobile unit, such as mobile unit 144, wishing to establish a new telephone call, synchronizes to a downlink slot (such as downlink slot 308E) in the current frame 302. The mobile unit 144 recognizes from its contents, that slot 308E is a general purpose, informational slot transmitted by the system. Slots of this type are called beacon slots.

A beacon slot contains control information of the type described above in the discussion of the control fields 402. A beacon slot does not necessarily have an information field associated with it, but it could have one, if the traffic load demands it. In that sense, for this embodiment of the present invention, any active slot can be considered to be a beacon slot for the system. For example, slot 308E could be a beacon slot containing system information such as the base stations good frequency list at that moment and the slots available for new calls in the next frame or mobile responses in the uplink of the current frame. The base station continuously monitors all uplink slots in every frame. The Mobile unit 144, wanting service, synchronizes to beacon slot 308E and reads the system information.

In step 346, the mobile unit 144 listens to all of the control fields 402 in the identified downlink slot 308E. The mobile unit 144 determines which of the antennas 118A–118D is the "best" antenna following the procedures for determining the "best" antenna discussed above. It is noted that the mobile unit 144 previously synchronized to, and maintains synchronization with, the timing of the frames transmitted from the base station 110 in any well known manner.

In step 348, the mobile unit 144, compares its own good frequency list to the base station list and selects a mutually acceptable frequency. There may be a delay involved if the chosen frequency is low on a list of sequentially received frequencies acceptable to the base station, since the base station may take several frames per frequency to pass through its entire list. From the available uplink slots, the Mobile 144, also selects its uplink slot. For example, the chosen slot could be slot 312E.

In step 350, the mobile unit 144 identifies an uplink slot, such as uplink slot 312E (the procedure for identifying available slots is described above), and transmits a request to establish a new telephone call to the base station 110 in the identified uplink slot 312E. Specifically, this new telephone call request is transmitted in the control slot field (of the uplink slot 312E). The best antenna information is also sent in the appropriate z field of the selected uplink slot. For example, suppose that in step 346 the mobile unit 144 determined that the "best" antenna was antenna 118A. Accordingly, in step 350, the mobile unit 144 transmits a request to establish a new telephone call to the base station 110 in control field 402 in uplink slot 312E.

The request to establish a new telephone call may not be clearly transmitted to the base station 110. This may be due to noise or other effects in the communication environment. This may also be due to conflict between multiple mobile units attempting to transmit during the same slot 312E, for example. The unsuccessful transmission of a new telephone call request does not adversely affect the operation of the system, since the mobile unit 144 can resend the request (if necessary) in the next frame.

Upon receiving the request for a new telephone call from the mobile unit 144, the base station 110 determines whether to accept the request. The base station 110 makes this determination as described above. If the base station 110 accepts the request for a new telephone call, then the base station 110 will preferably communicate that acceptance in the downlink slot 308E (of the next frame) selected in step 348. Such acceptance is preferably in the form of a control message in field 402F containing information that identifies at least the mobile unit 144 who made the request, and that identifies the frequency, downlink 308, uplink slot 312, and an antenna 118 control message in the appropriate z field.

In step 352, the mobile unit 144 determines whether the new call request was accepted by monitoring the downlink slot 308 (of the next frame) which it selected in step 348. The absence of control data directed to it indicates that the new call request was not accepted. In this case, control returns to step 346.

If the new call request was accepted (as determined in step 352), then the mobile unit 144 in step 356 transmits data in its assigned uplink slot 312E. Operation of the flowchart 340 is complete after the completion of step 356, as indicated by step 358. Once the call is established, operation of the base station 110 and the mobile unit 144 is as shown in FIG. 3B, described above.

5.4. The BIG EAR Mode of the Second Embodiment

Since the base 110 is not aware of when or on what slot mobile units 144 will initiate a dialogue, the random access mode of communication requires that the antennas 118 associated with the base 110 be connected simultaneously for the period of time associated with each of the unassigned uplink slots. This mode of operation of the switch 112, is herein called "BIG EAR", since all CAUs 118 connected to the base station 110 via the switch 112 are listening at the same time. In this way, the base 110 is able to receive the mobile unit's uplink transmission without having to know where the mobile unit is. Once having received the transmission requesting the slot, the base 110 utilizes the assigned antenna and the requested slot and frequency for its transmitted response back to the mobile 144, acknowledging assignment of the chosen slot for communication with the mobile unit 144, as described above. Until indicated otherwise, the assigned antenna 118 would be used by the base 110 for both reception and transmission of the assigned slot, unless one of the z fields 402A-402D changes as described above.

6. Third Embodiment- Use in Multi-Cell Systems

According to a third embodiment of the invention, the frame structure described above for the second embodiment of the invention is used to span many cells. With reference to FIG. 5, the operation of this third embodiment allows for user data service to be provided on an uninterrupted basis as an active mobile unit is moved from one cell to the next, e.g., from cell 114 to cell 126 (FIG. 5). Such a capability, known as hand-off, is made possible through hardware additions and control protocol additions to the single cell system described above. Such additions are well known to system designers and persons skilled in the art of wireless systems. For example, a well known feature of the PBX 104 is added to provide for connectivity changes from one WFB 110 to a second WFB 122 during a voice conversation. In addition, certain well known control codes are added to the control fields in both the stationary end (WFBs 110,122, Interface/controller 108,140 and 120,142, or PBX 104) and mobile unit 144, and its controller 146, to accomplish the tasks and communication necessary for hand-off.

Hand-off is a process which, because of its high impact on shared hardware and control resource utilization, should be used sparingly. This is allowed for by choosing hand-off criteria that allow for switching between cells only when the general performance of one cell has degraded to the extent that hand-off to another cell (if better) is warranted. In general, this results in two characteristics which are discussed further below: 1) the number of hand-offs during the time a mobile unit is active (e.g., on a call) is on the order of one or two per minute; and 2), the time over which the transition occurs (from recognition that hand-off is needed to completion of hand-off) occurs over many frames (e.g., 40 to 50).

Thus, the metrics used to determine when hand-off is needed are those that tend not to include the short term variations in signal quality which the present invention is able to combat. For example, the invention might use measures of BER variations over two frames to determine "best" antenna for a subsequent frame and subsequently, antenna switching can occur on every frame. On the other hand, hand-off criteria are averaged over many frames (20 to 30) and the interval between hand-offs would occur on the order of seconds to minutes. The operation of the present invention serves to provide better service within a cell by combating short term impairment occurrences. Hand-off, on the other hand, combats long term impairments due to inter-cell movement. In this way, the operation of the present invention does not hinder the operation necessary for inter-cell hand-off, and, in fact, uses it for multi cell operation, as well.

The control mechanism described in the second embodiment of the present invention provides for a separation of antenna control and other system control functions. Specifically, the location and use of the antenna fields in an active slot in no way impedes the use of the other fields used for system control functions such as for hand-off communication.

Thus, both from the physical level perspective and from the control mechanism perspective, the present invention may be active in such systems that provide for multi-cell operation and provide both increased base station coverage and macro diversity in a form transparent to the multi-cell operation.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of achieving increased coverage and macro diversity from a single base station in a wireless communication system having a base station coupled to N antennas, said method comprising the steps of:

(1) transmitting from said base station N control messages in N downlink control slots of a frame each via one of said antennas;

(2) transmitting a data message addressed to a mobile unit in one of N downlink data slots of said frame via a particular one of said antennas previously assigned to said mobile unit for the duration of an active call;

(3) receiving in said mobile unit said control messages and said data message;

(4) analyzing in said mobile unit said control messages to identify from said antennas a best antenna;

(5) transmitting from said mobile unit to said base station a new antenna request identifying said best antenna in one of N uplink control slots of said frame, said one of N uplink control slots being associated with said particular one of said antennas; and (6) using in response to said new antenna request said best antenna to transmit from said base station one or more subsequent data messages addressed to said mobile unit.

2. The method of claim 1, wherein step (1) comprises the steps of:

(a) connecting said base station to one of said antennas;

(b) transmitting from said base station a control message via said one of said antennas in a downlink control slot associated with said one of said antennas; and (c) performing steps (a) and (b) for each of said antennas.

3. The method of claim 1, wherein step (2) comprises the step of:

transmitting said data message via said particular one of said antennas in a downlink data slot previously assigned to said mobile unit.

4. The method of claim 1, further comprising the following steps which are performed after step (4):

determining whether said best antenna is equal to said particular one of said antennas previously assigned to said mobile unit; and bypassing performance of step (5) if said best antenna is equal to said particular one of said antennas previously assigned to said mobile unit.

5. The method of claim 1, further comprising the steps of:

(7) receiving in a second mobile unit desiring to establish a new telephone call said control messages;

(8) analyzing in said second mobile unit said control messages to identify from said antennas a best antenna with respect to said second mobile unit; and (9) transmitting from said second mobile unit to said base station a new telephone call request identifying said best antenna with respect to said second mobile unit in a second uplink control slot of said frame.

6. A method of achieving increased coverage and macro diversity from a single base station in a wireless communication system having a base station coupled to N antennas, comprising the steps of:

(1) transmitting from said base station N control messages in N control fields of a downlink control/data slot of a frame, said downlink control/data slot being associated with a mobile unit for the duration of an active call, each of said control messages being transmitted via one of said antennas;

(2) transmitting a data message addressed to said mobile unit in a data field of said downlink control/data slot, said data message being transmitted via a particular one of said antennas previously assigned to said mobile unit;

(3) receiving in said mobile unit said control messages and said data message;

(4) analyzing in said mobile unit said control messages to identify from said antennas a best antenna;

(5) transmitting from said mobile unit to said base station a new antenna request identifying said best antenna in a control field of an uplink control/data slot of said frame, said uplink control/data slot being associated with said mobile unit for the duration of an active call, said control field of said uplink control/data slot being associated with said particular one of said antennas; and (6) using in response to said new antenna request said best antenna to transmit from said base station one or more subsequent data messages addressed to said mobile unit.

7. The method of claim 6, wherein step (1) comprises the steps of:

(a) connecting said base station to one of said antennas;

(b) transmitting from said base station a control message via said one of said antennas in a control field of said downlink control/data slot associated with said one of said antennas;

(c) performing steps (a) and (b) for each of said antennas.

8. The method of claim 6, further comprising the following steps which are performed after step (4):

determining whether said best antenna is equal to said particular one of said antennas previously assigned to said mobile unit; and bypassing performance of step (5) if said best antenna is equal to said particular one of said antennas previously assigned to said mobile unit.

9. The method of claim 6, further comprising the steps of:

(7) transmitting from said base station control messages in control fields of a downlink beacon slot of said frame, each of said control messages comprising information identifying slots and frequencies available for use in new telephone calls, and also comprising antenna control information transmitted from each of said antennas;

(8) receiving in a second mobile unit desiring to establish a new telephone call said control messages in said beacon slot;

(9) analyzing in said second mobile unit said control messages to identify from said antennas a best antenna with respect to said second mobile unit;

(10) selecting one of said available slots; and

(11) transmitting from said second mobile unit to said base station a new telephone call request identifying said selected available slot and said best antenna with respect to said second mobile unit in a control field of an unassigned uplink slot of said frame.

10. The method of claim 9, further comprising the step of:

(12) simultaneously connecting all of said antennas to said base station when said base station receives unassigned uplink slots of said frame, such that said base station can receive and process any new telephone call requests transmitted in said unassigned uplink slots.

11. A radio sub-system of a wireless communication system, comprising:

a base station;

N antennas each positioned in a sub-cell of a cell;

a switch connected to said base station and to said antennas, to selectively connect said base station to said antennas; and a mobile unit;

said base station comprising:

means for transmitting N control messages in N downlink control slots of a frame each via one of said antennas; and means for transmitting a data message addressed to said mobile unit in one of N downlink data slots of said frame via a particular one of said antennas previously assigned to said mobile unit;

said mobile unit comprising:

means for receiving said control messages and said data message;

means for analyzing said control messages to identify from said antennas a best antenna; and means for transmitting to said base station a new antenna request identifying said best antenna in one of N uplink control slots of said frame, said one of N uplink control slots being associated with said particular one of said antennas.

12. The radio sub-system of claim 11, wherein said base station further comprises:

means for using in response to said new antenna request said best antenna to transmit one or more subsequent data messages addressed to said mobile unit.

13. The radio sub-system of claim 11, further comprising a second mobile unit desiring to establish a new telephone call, said second mobile unit comprising:

means for receiving said control messages;

means for analyzing said control messages to identify from said antennas a best antenna with respect to said second mobile unit; and means for transmitting to said base station a new telephone call request identifying said best antenna with respect to said second mobile unit.

14. A radio subsystem of a wireless communication system, comprising:

a base station;

N antennas each positioned in a sub-cell of a cell;

a switch connected to said base station and to said antennas, to selectively connect said base station to said antennas; and a mobile unit;

said base station comprising:

means for transmitting N control messages in N control fields of a downlink beacon slot each via one of said antennas;

means for transmitting system messages in at least one system message field of said downlink beacon slot;

means for transmitting system related control information in at least one system related field of said downlink beacon slot; and means for transmitting a data message addressed to said mobile unit via a particular one of said antennas previously assigned to said mobile unit;

said mobile unit comprising:

means for receiving said control messages and said data message;

means for analyzing said control messages to identify from said antennas a best antenna; and means for transmitting to said base station a new antenna request identifying said best antenna.

15. The radio sub-system of claim 14, further comprising a second mobile unit desiring to establish a new telephone call, said second mobile unit comprising:

means for receiving said control messages contained in said downlink slot;

means for analyzing said control messages to identify from said antennas a best antenna with respect to said second mobile unit;

means for selecting one of available time slots and one of available frequency channels; and means for transmitting to said base station a new telephone call request identifying said selected available time slot, said selected available frequency channel, and said best antenna with respect to said second mobile unit in a control field of an uplink beacon slot.

* * * * *